US012236053B2

(12) United States Patent
Takiguchi et al.

(10) Patent No.: US 12,236,053 B2
(45) Date of Patent: Feb. 25, 2025

(54) SENSOR CONTROLLER INCLUDING A NEURAL NETWORK PROCESSOR TO RECEIVE SENSING SIGNALS AND TO OUTPUT A SENSING RESULT, AND DISPLAY DEVICE INCLUDING THE SAME

(71) Applicant: SAMSUNG DISPLAY CO., LTD., Yongin-si (KR)

(72) Inventors: Masahiko Takiguchi, Yokohama (JP); Kazuhiro Matsumoto, Yokohama (JP); Satoshi Uchino, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/485,400

(22) Filed: Oct. 12, 2023

(65) Prior Publication Data
US 2024/0201816 A1 Jun. 20, 2024

(30) Foreign Application Priority Data
Dec. 19, 2022 (KR) ........................ 10-2022-0178668

(51) Int. Cl.
G06F 3/044 (2006.01)
G06F 3/041 (2006.01)

(52) U.S. Cl.
CPC ........ *G06F 3/0446* (2019.05); *G06F 3/04182* (2019.05); *G06F 2203/04101* (2013.01)

(58) Field of Classification Search
None
See application file for complete search history.

(56) References Cited

U.S. PATENT DOCUMENTS

| 9,965,105 | B2 | 5/2018 | Hoch et al. | |
| 11,216,135 | B2 | 1/2022 | Tabata | |
| 11,460,961 | B2 | 10/2022 | Goyal et al. | |
| 2012/0056846 | A1* | 3/2012 | Zaliva | G06F 3/04166 345/173 |
| 2013/0173211 | A1* | 7/2013 | Hoch | G06F 3/0445 702/150 |
| 2020/0012382 | A1* | 1/2020 | Lee | G06F 3/04186 |
| 2020/0050341 | A1* | 2/2020 | Tabata | G06F 3/041661 |
| 2020/0285342 | A1* | 9/2020 | Hungerford | G06F 3/0416 |
| 2021/0055814 | A1* | 2/2021 | Goyal | G06N 20/00 |

FOREIGN PATENT DOCUMENTS

| JP | 6924997 | 8/2021 |
| WO | 2018193711 | 10/2018 |

* cited by examiner

Primary Examiner — Kirk W Hermann
(74) Attorney, Agent, or Firm — F. CHAU & ASSOCIATES, LLC

(57) ABSTRACT

A sensor controller includes a neural network processing unit to receive a sensing signal from an input sensor and to output one of a first sensing result and a second sensing result using a prediction model. The sensor controller further includes a first input processing unit and a second input processing unit. The first input processing unit is to receive the first sensing result and to determine whether a first input is present based on the first sensing result. The second input processing unit is to receive the second sensing result and to calculate a coordinate signal for a second input based on the second sensing result.

20 Claims, 14 Drawing Sheets

C2

C3

FIG. 10C
FIG. 10D
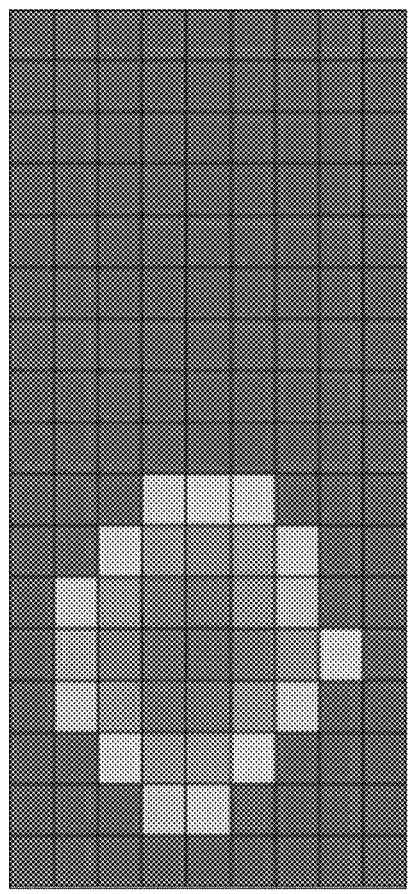
C6
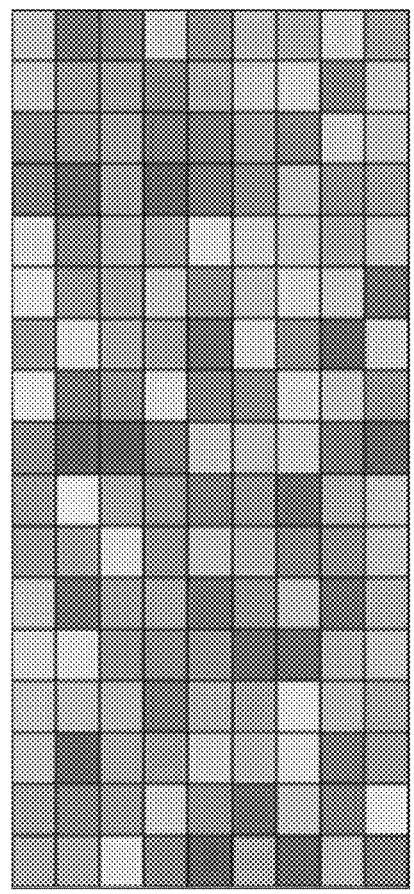
C7

FIG. 10E
FIG. 10F
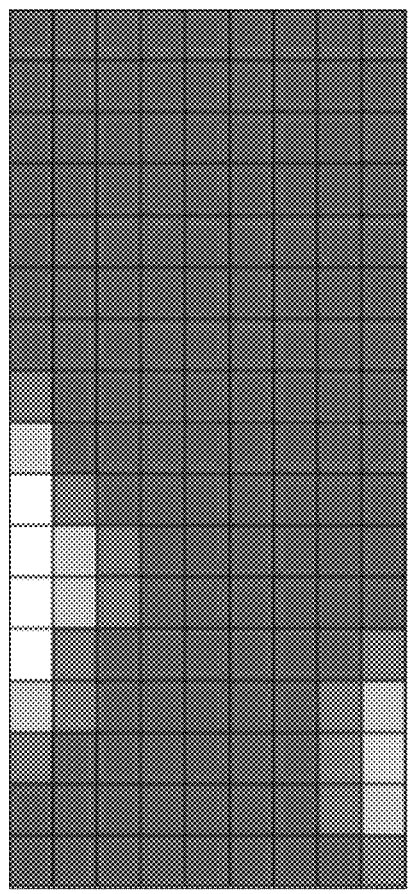
C8
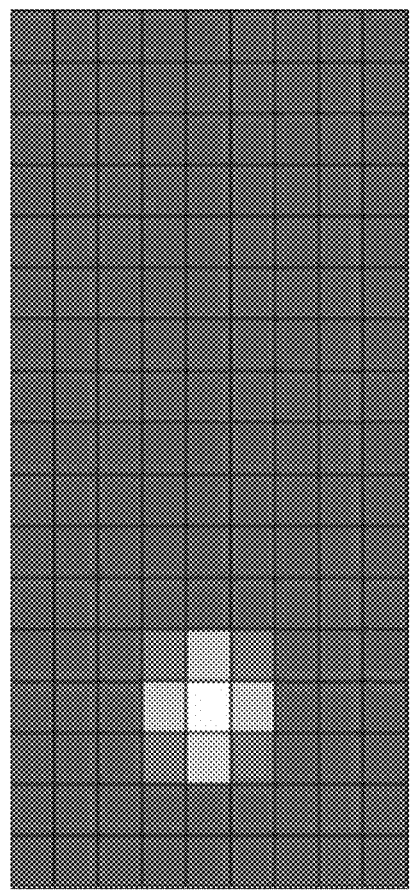
C9

SENSOR CONTROLLER INCLUDING A NEURAL NETWORK PROCESSOR TO RECEIVE SENSING SIGNALS AND TO OUTPUT A SENSING RESULT, AND DISPLAY DEVICE INCLUDING THE SAME

CROSS-REFERENCE TO RELATED APPLICATIONS

This application claims priority under 35 U.S.C. § 119 to Korean Patent Application No. 10-2022-0178668, filed on Dec. 19, 2022, in the Korean Intellectual Property Office, the disclosure of which is incorporated by reference herein in its entirety.

BACKGROUND

1. Technical Field

One or more embodiments described herein relate to a sensor controller and a display device including the same.

2. Description of the Related Art

A variety of multimedia electronic devices have been developed. Examples include televisions, cellular phones, tablet computers, navigation systems, and game consoles. Each of these devices includes a display that displays still and/or moving images. The display may include an input sensor that provides a touch-based input for enabling a user to intuitively, conveniently, and easily input information or commands. These displays may also allow information to be input using a button, a keyboard, or a mouse.

SUMMARY

One or more embodiments described herein provide a display device which is capable of simultaneously detecting proximity and touch inputs.

These or other embodiments provide a prediction model which may be executed by a processor to aid in the prediction of proximity and touch inputs.

These or other embodiments may use the prediction model to distinguish between a proximity input and a touch input based on a sensing signal generated by an input sensor of a display device.

According to an embodiment, a sensor controller includes a neural network processing unit to receive a sensing signal from an input sensor and to output one of a first sensing result and a second sensing result using a prediction model. The sensor controller also includes a first input processing unit to receive the first sensing result and to determine whether a first input is present based on the first sensing result, and a second input processing unit to receive the second sensing result and to calculate a coordinate signal for a second input based on the second sensing result.

According to an embodiment, a display device includes a display panel to display an image, an input sensor disposed on the display panel to sense a first input or a second input, a sensor controller to control driving of the input sensor, and a panel driver to control driving of the display panel.

The sensor controller includes a neural network processing unit to receive a sensing signal from the input sensor and to output one of a first sensing result and a second sensing result by using a prediction model. The sensor controller also includes a first input processing unit to receive the first sensing result and to determine whether the first input is present based on the first sensing result, and a second input processing unit to receive the second sensing result, and to calculate a coordinate signal of the second input, based on the second sensing result.

According to an embodiment, a sensor controller includes an input configured to receive a sensing signal; and a first processor configured to implement a prediction model to generate a first sensing result and a second sensing result, wherein the prediction model is configured to generate the first sensing result when the sensing signal is determined to correspond to a first class and is configured to generate the second sensing result when the sensing signal is determined to correspond to a second class, wherein the sensing signal is received from an input sensor of a display device. The first class may correspond to a proximity input and the second class may correspond to a touch input.

The first sensing result may correspond to a distance between an object and the input sensor, and the sensor controller may include a second processor configured to generate a proximity detection signal when the distance is less than a threshold value. The second sensing result may be generated when the distance is greater than the threshold value, and the sensor controller may include a third processor configured to generate a touch input signal based on the second sensing result.

BRIEF DESCRIPTION OF THE FIGURES

The objects and features described herein will become apparent by describing in detail embodiments thereof with reference to the accompanying drawings.

FIGS. 10A to 10F are views illustrating some of a plurality of output classes set in a detecting unit according to an embodiment of the present disclosure.

DETAILED DESCRIPTION

Figure 1:
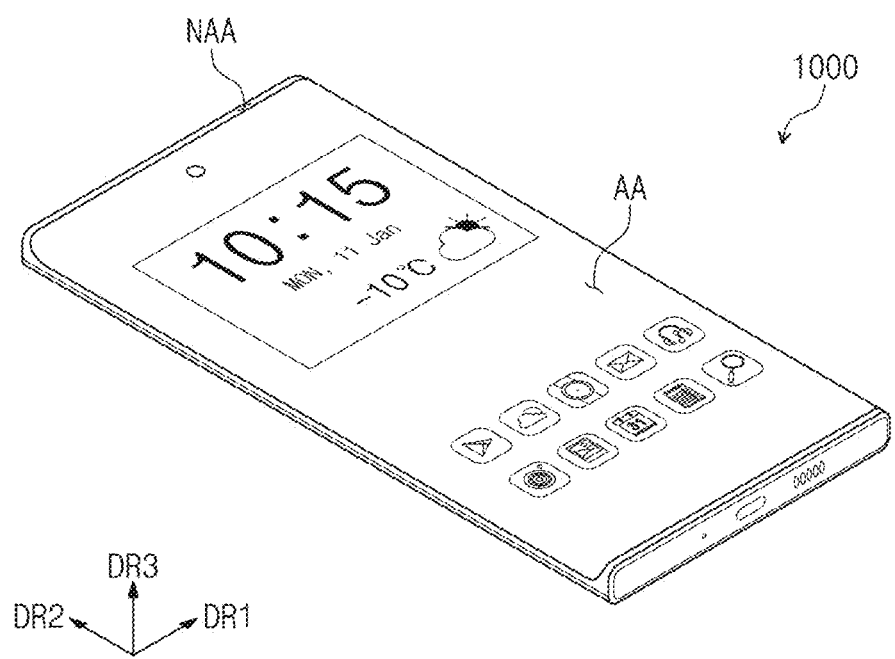
FIG. 1 is a perspective view of a display device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is interposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "below", "on", "above", etc. are used to describe the correlation of components illustrated in drawings. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of a display device 1000 according to an embodiment of the present disclosure.

Referring to FIG. 1, the display device 1000 may be activated in response to an electrical signal. For example, the display device 1000 may be a cellular phone, a foldable phone, a laptop computer, a television, a tablet, a vehicle navigation system, a game console, or a wearable device, but the present disclosure is not limited thereto. FIG. 1 illustrates that the display device 1000 is the cellular phone as an example.

The display device 1000 may include an active region AA and a peripheral region NAA. The display device 1000 may display an image through the active region AA. The active region AA may include a surface that extends in a first direction DR1 and a second direction DR2. The peripheral region NAA may partially or completely surround the active region AA. A thickness direction of the display device 1000 may be parallel to a third direction DR3 crossing the first direction DR1 and the second direction DR2. Accordingly, front surfaces (or top surfaces) and rear surfaces (or bottom surfaces) of features constituting the display device 1000 may be explained based on the third direction DR3.

Figure 2:
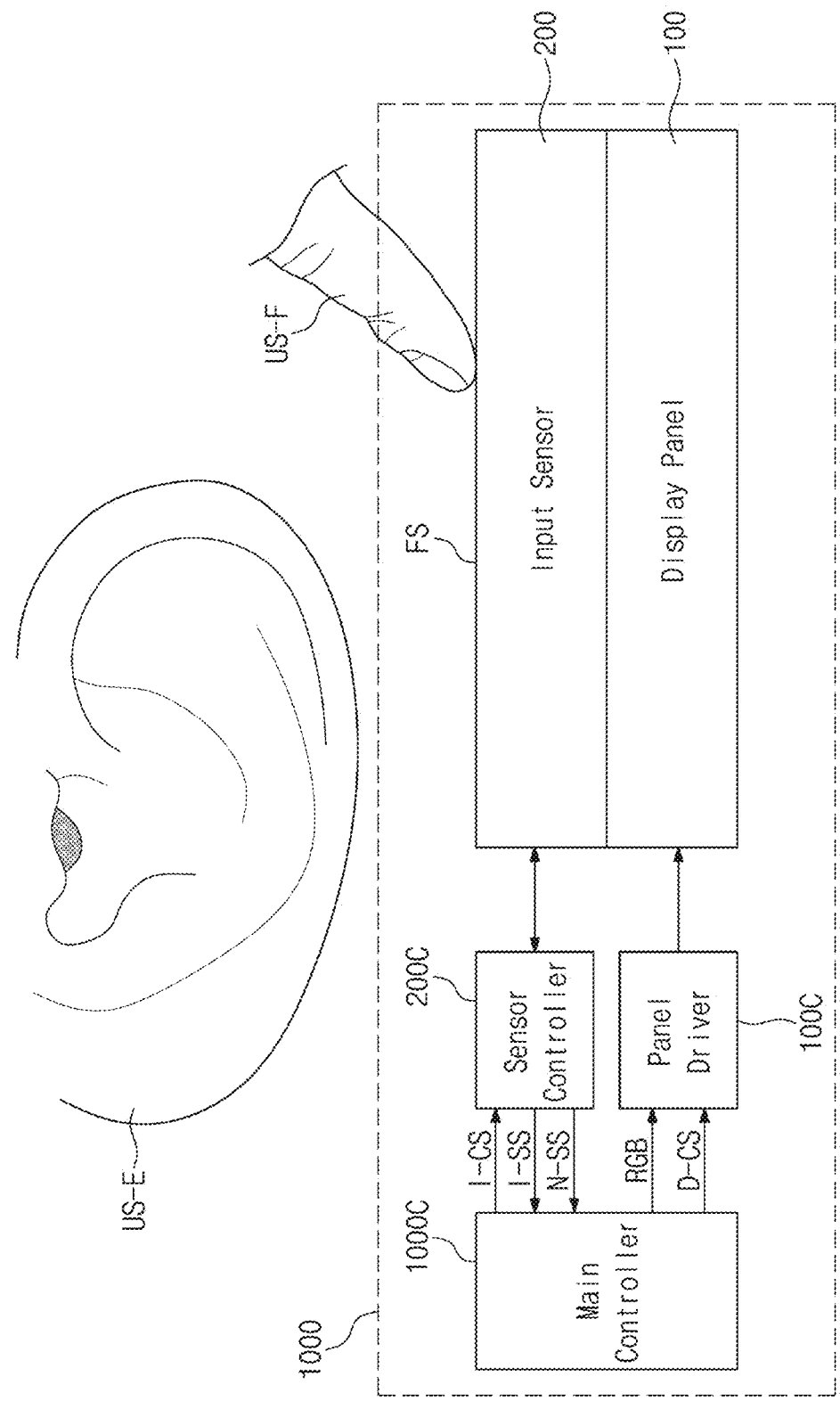
FIG. 2 is a view to describe an operation of a display device according to an embodiment of the present disclosure.

FIG. 2 is a view to describe an operation of the display device 1000 according to an embodiment of the present disclosure.

Referring to FIG. 2, the display device 1000 may include a display panel 100, an input sensor 200, a panel driver 100C, a sensor controller 200C, and a main controller 1000C. The display panel 100 may be a component that substantially generates an image. The display panel 100 may be an emissive-type display panel. For example, the display panel 100 may be an organic light emitting display panel, an inorganic light emitting display panel, a quantum dot display panel, a micro-LED display panel, or a nano-LED display panel.

The input sensor 200 may be disposed on the display panel 100. The input sensor 200 may sense an external input. The external input may include inputs received through an input unit, which, for example, produce a change in capacitance or resistance. The input sensor 200 may sense whether an object is approaching a surface FS of the display device 1000 (or whether a first input is present). Although FIG. 2 illustrates an ear US-E of a user, which comes into proximity to the display device 1000, the object may be another body part (e.g., a face) of a user. The input sensor 200 may sense a touch (or a second input) of the surface FS of the display device 1000. The second input may include an input sensed by an active-type input unit that transmits and receives signals, as well as an input sensed by a passive-type input unit that receives input from a body part (for example, a finger US-F) of the user.

The main controller 1000C may control overall operation of the display device 1000. For example, the main controller 1000C may control operations of the panel driver 100C and the sensor controller 200C. The main controller 1000C may include at least one microprocessor and may be referred to as a "host". The main controller 1000C may further include a graphics controller.

The panel driver 100C may drive the display panel 100. The panel driver 100C may receive image data RGB and a display control signal D-CS from the main controller 1000C. The display control signal D-CS may include various signals. For example, the display control signal D-CS may include a vertical synchronization signal, a horizontal synchronization signal, a main clock, or a data enable signal. The panel driver 100C may generate a scan control signal and a data control signal for controlling the driving of the display panel 100 based on the display control signal D-CS.

The sensor controller 200C may control the driving of the input sensor 200. The sensor controller 200C may receive a sensing control signal I-CS from the main controller 1000C. The sensing control signal I-CS may include a sensing synchronization signal and a clock signal. In addition to the sensing control signal I-CS, the main controller 1000C may provide some signals of the display control signal D-CS, for example, the vertical synchronization signal or the horizontal synchronization signal, to the sensor controller 200C.

The sensor controller 200C may sense whether the first (proximity) input is present based on a signal received from the input sensor 200. The sensor controller 200C may provide a proximity sensing signal N-SS, including sensing information on a proximity object, to the main controller 1000C. The main controller 1000C may reduce the brightness of the image displayed on the display panel 100 based on the proximity sensing signal N-SS, or may operate the panel driver 100C such that images are not displayed on the display panel 100. For example, the main controller 1000C may turn off the screen of the display device 1000 based on the proximity sensing signal N-SS.

The sensor controller 200C may calculate coordinate information of the second (touch) input based on the signal received from the input sensor 200 and provide a coordinate signal I-SS having the coordinate information to the main controller 1000C. The main controller 1000C executes an operation corresponding to the second input based on the coordinate signal I-SS. For example, the main controller 1000C may operate the panel driver 100C such that a new application image is displayed on the display panel 100.

Figure 3A:
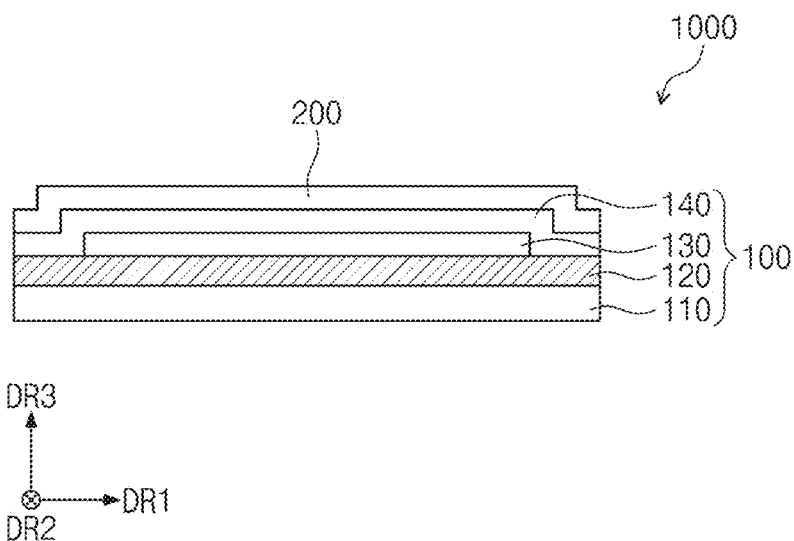
FIG. 3A is a cross-sectional view of a display device according to an embodiment of the present disclosure.

FIG. 3A is a cross-sectional view of the display device 1000 according to an embodiment of the present disclosure.

Referring to FIG. 3A, the display device 1000 may include the display panel 100 and the input sensor 200. The display panel 100 may include a base layer 110, a circuit layer 120, a light emitting element layer 130, and an encapsulation layer 140. The base layer 110 may provide a base surface for supporting the circuit layer 120. The base layer 110 may be a glass substrate, a metal substrate, a polymer substrate, or the like. However, an embodiment is not limited thereto, and the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include polyimide-based resin. Additionally, or alternatively, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin.

The circuit layer 120 may be disposed on the base layer 110. The circuit layer 120 may include an insulating layer, a semiconductor pattern, a conductive pattern, a signal line, and the like. The insulating layer, the semiconductor layer, and the conductive layer may be formed on the base layer 110, for example, by a coating or deposition process. The insulating layer, the semiconductor layer, and the conductive layer may then be selectively patterned through a plurality of photolithography processes. Afterwards, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may be an organic light emitting material, an inorganic light emitting material, a quantum dot, a quantum rod, a micro LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The input sensor 200 may be disposed on the display panel 100. The input sensor 200 may sense an external input (that is, the first input and the second input). The external input may be an input of a user. The user input may include various types of external inputs such as inputs generated by a part of a body of the user, light, heat, a stylus or pen, or pressure.

The input sensor 200 may be disposed on the display panel 100 through one or more subsequent processes. In this case, the input sensor 200 may be directly disposed on the display panel 100. The wording "directly disposed" may refer to the case where a third component is not interposed between the input sensor 200 and the display panel 100. For example, a separate adhesive member may not be interposed between the input sensor 200 and the display panel 100. In one embodiment, the input sensor 200 may be coupled to the display panel 100 through an adhesive member. The adhesive member may include a typical adhesive or an adhesion agent.

The display device 1000 may further include an anti-reflection layer and an optical layer, which are disposed on the input sensor 200. The anti-reflection layer may reduce reflectance of external light incident from outside of the display device 1000. The optical layer may improve the brightness of the front surface of the display device 1000 by controlling a direction of light incident from the display panel 100.

Figure 3B:
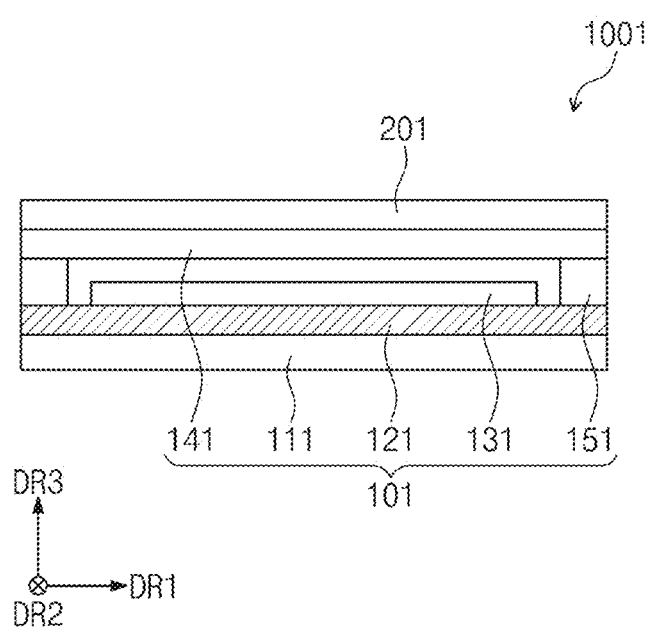
FIG. 3B is a cross-sectional view of a display device according to an embodiment of the present disclosure.

FIG. 3B is a cross-sectional view of a display device 1001 according to an embodiment of the present disclosure.

Referring to FIG. 3B, the display device 1001 may include a display panel 101 and an input sensor 201. The display panel 101 may include a base substrate 111, a circuit layer 121, a light emitting element layer 131, an encapsulation substrate 141, and a coupling member 151. Each of the base substrate 111 and the encapsulation substrate 141 may be a glass substrate, a metal substrate, a polymer substrate, or the like, but is not particularly limited thereto.

The coupling member 151 may be interposed between the base substrate 111 and the encapsulation substrate 141. The coupling member 151 may couple the encapsulation substrate 141 to the base substrate 111 or the circuit layer 121. The coupling member 151 may include an inorganic material or an organic material. For example, the inorganic material may include a frit seal, and the organic material may include a photo-curable resin or a photo-plastic resin. However, a material of the coupling member 151 is not limited to the above example.

The input sensor 201 may be directly disposed on the encapsulation substrate 141. As previously indicated, the expression "directly disposed" may include the case where a third component is not interposed between the input sensor 201 and the encapsulation substrate 141. For example, a separate adhesive member may not be interposed between the input sensor 201 and the display panel 101. However, the present disclosure is not limited thereto, and an adhesive layer may be interposed between the input sensor 201 and the encapsulation substrate 141.

Figure 4:
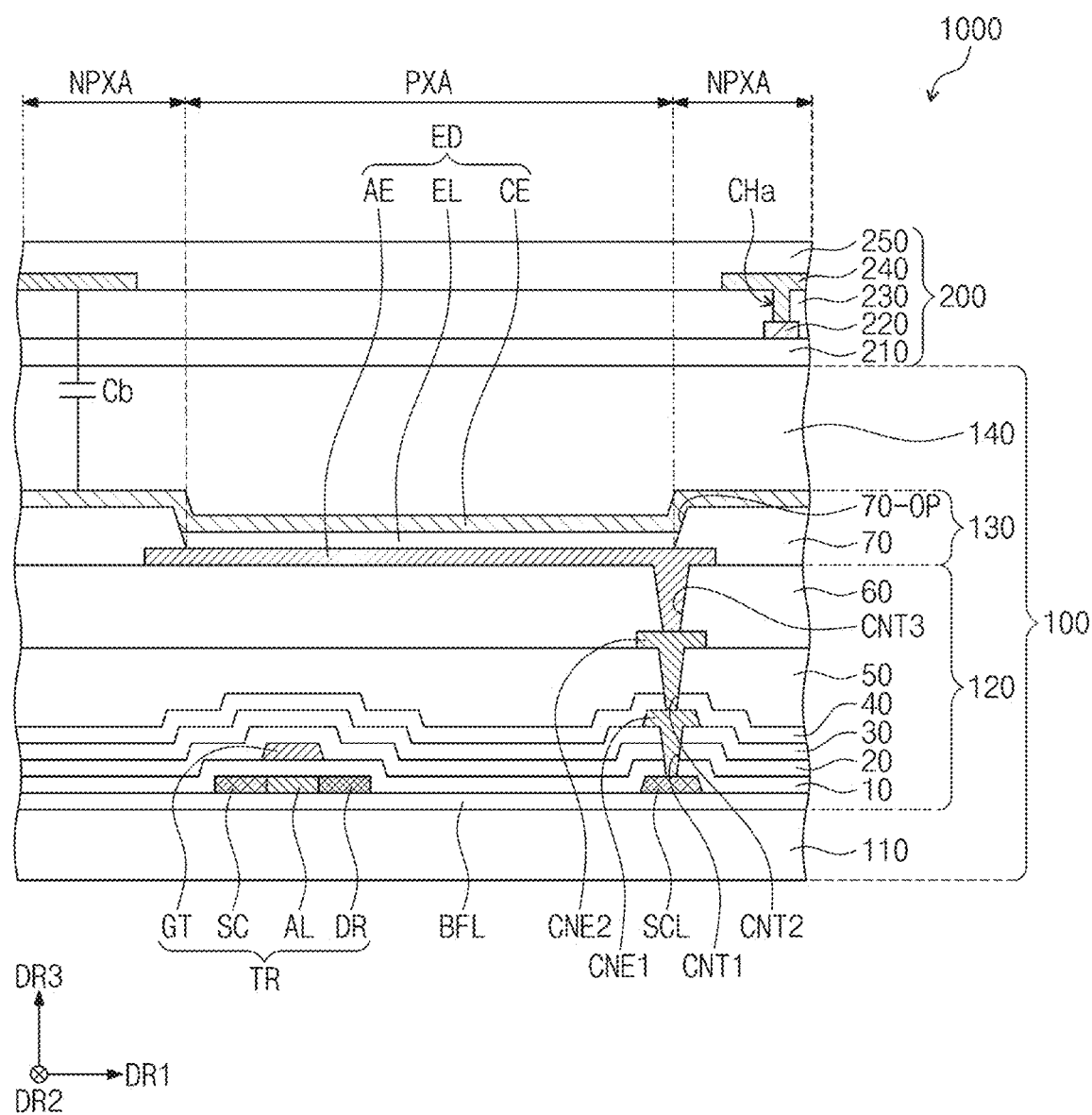
FIG. 4 is a cross-sectional view showing a portion of a display device according to an embodiment of the present disclosure.

FIG. 4 is a cross-sectional view showing a portion of the display device 1000 according to an embodiment of the present disclosure.

Referring to FIG. 4, the display device 1000 may include at least one inorganic layer formed on a top surface of the base layer 110. The inorganic layer may include at least one of aluminum oxide, titanium oxide, silicon oxide, silicon nitride, silicon oxynitride, zirconium oxide, or hafnium oxide. The inorganic layer may have a multi-layer structure. Multi-inorganic layers may constitute a barrier layer and/or a buffer layer. According to the present embodiment, the display panel 100 is illustrated as including a buffer layer BFL.

The buffer layer BFL may improve bonding force between the base layer 110 and a semiconductor pattern. The buffer layer BFL may include at least one of silicon oxide, silicon nitride, or silicon oxynitride. For example, the buffer layer BFL may include a structure in which a silicon oxide layer and a silicon nitride layer are alternately stacked.

The semiconductor pattern may be disposed on the buffer layer BFL. For example, the semiconductor pattern may include polysilicon. However, the present disclosure is not limited thereto, and the semiconductor pattern may include amorphous silicon, low-temperature polycrystalline silicon, or oxide semiconductor.

FIG. 4 only illustrates a portion of the semiconductor pattern. The semiconductor pattern may be further disposed in another region. Semiconductor patterns may be arranged across pixels in a specific rule. The semiconductor patterns may have different electrical properties depending on whether they are doped. The semiconductor patterns may include a first region having higher conductivity and a second region having lower conductivity. The first region may be doped with N-type dopants or P-type dopants. A P-type transistor may include a doping region doped with the P-type dopant, and an N-type transistor may include a doping region doped with the N-type dopant. The second region may be a non-doping region or may be a region doped at a concentration lighter than the concentration of the first region.

The conductivity of the first region may be greater than the conductivity of the second region, and the first region may substantially serve as an electrode or a signal line. The second region may correspond to an active channel of a transistor substantially. For example, a portion of the semiconductor pattern may be a channel of a transistor, another portion of the semiconductor pattern may be a source region or a drain region of the transistor, and still another portion of the semiconductor pattern may be a connection electrode or a connection signal line.

In one example, each of the pixels may be expressed by an equivalent circuit including seven transistors, one capacitor, and a light emitting element ED, but the equivalent circuit of the pixel may be modified in various forms. One transistor TR and one light emitting element ED included in a pixel are illustrated in FIG. 4 by way of example.

The transistor shown in FIG. 4 includes a source SC, a channel AL and a drain DR formed from the semiconductor pattern. The source SC and the drain DR may extend in directions opposite to each other, when viewed from the channel AL. A portion of a connection signal line SCL formed from the semiconductor pattern is illustrated in FIG. 4. Although not separately illustrated, the connection signal line SCL may be connected to the drain DR of the transistor TR when viewed in a plan view.

A first insulating layer 10 may be disposed on the buffer layer BFL. The first insulating layer 10 may be commonly provided in a plurality of pixels to cover the semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, or hafnium oxide. According to an embodiment, the first insulating layer 10 may be a single silicon oxide layer. In addition to the first insulating layer 10, each of insulating layers of the circuit layer 120 to be described later may be an inorganic layer and/or an organic layer, and may have a single-layer or multi-layer structure. The inorganic layer may include at least one of the materials described above but is not limited thereto.

A gate GT of the transistor TR is disposed on the first insulating layer 10. The gate GT may be a portion of a metal pattern. The gate GT is overlapped with the channel AL. The gate GT may serve as a mask in the process of doping the semiconductor pattern.

A second insulating layer 20 may be disposed on the first insulating layer 10 to cover the gate GT. The second insulating layer 20 may be commonly overlapped with the pixels. The second insulating layer 20 may be an inorganic layer and/or an organic layer, and may have a single-layer structure or a multi-layer structure. The second insulating layer 20 may include at least one of silicon oxide, silicon nitride, or silicon oxynitride. According to the present embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. According to the present embodiment, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a first contact hole CNT1 penetrating the first, second, and third insulating layers 10, 20, and 30.

A fourth insulating layer 40 may be disposed on the third insulating layer 30. The fourth insulating layer 40 may be a silicon oxide layer having a single-layer structure. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a second contact hole CNT2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element ED. For example, the light emitting element layer 130 may be an organic light emitting material, an inorganic light emitting material, a quantum dot, a quantum rod, a micro LED, or a nano LED. The following description will describe the light emitting element ED as an organic light emitting element, by way of example, but the present disclosure is not specifically limited thereto.

The light emitting element ED may include a first electrode AE, a light emitting layer EL, and a second electrode CE. The first electrode AE may be disposed on the sixth insulating layer 60. The first electrode AE may be connected to the second connection electrode CNE2 via a third contact hole CNT3 formed through the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active region AA (e.g., refer to FIG. 1) may include a light emitting region PXA and a non-light emitting region NPXA adjacent to the light emitting region PXA. The non-light emitting region NPXA may partially or completely surround the light emitting region PXA. According to an embodiment, the light emitting region PXA may correspond to the portion of the first electrode AE, which is exposed by the opening 70-OP.

The light emitting layer EL may be disposed on the first electrode AE. The light emitting layer EL may be disposed in a region determined by the opening 70-OP. For example, the light emitting layer EL may be separately formed in each of pixels. When the light emitting layer EL is separately formed in each pixel, each of the light emitting layers EL may emit light of at least one of a blue color, a red color, or a green color. However, the present disclosure is not limited thereto. For example, the plurality of light emitting layers EL may be connected to each other to be provided in common to the plurality of pixels. In this case, the light emitting layer EL integrally provided may provide a blue light or may provide a white light. In other embodiments, different colors of light may be emitted by the light emitting layers.

The second electrode CE may be disposed on the light emitting layer EL. The second electrode CE may be provided in the form of a common electrode disposed in the plurality of pixels in common.

A hole control layer may be interposed between the first electrode AE and the light emitting layer EL. The hole control layer may be commonly disposed in the light emitting region PXA and the non-light emitting region NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be commonly formed in the pixels, for example, by using an open mask.

The encapsulation layer 140 may be disposed on the light emitting element layer 130. The encapsulation layer 140 may include an inorganic layer, an organic layer, and an inorganic layer sequentially stacked. A different combination of layers may constitute the encapsulation layer 140 in other embodiments.

The inorganic layers may protect the light emitting element layer 130 from moisture and oxygen. The organic layer may protect the light emitting element layer 130 from a foreign material such as dust particles. The inorganic layers may include a silicon nitride layer, a silicon oxynitride layer, a silicon oxide layer, a titanium oxide layer, and/or an aluminum oxide layer. The organic layer may include an acrylic-based organic layer, but the present disclosure is not limited thereto.

The input sensor 200 may include a base insulating layer 210, a first conductive layer 220, a sensor insulating layer 230, a second conductive layer 240, and a cover insulating layer 250. The base insulating layer 210 may be an inorganic layer including at least one of silicon nitride, silicon oxynitride, or silicon oxide. In one embodiment, the base insulating layer 210 may be an organic layer including an epoxy resin, an acrylic resin, or an imide-based resin. The base insulating layer 210 may have a single-layer structure or may be a multi-layer structure in which a plurality of layers are stacked along the third direction DR3.

Each of the first conductive layer 220 and the second conductive layer 240 may have a single-layer structure or a multi-layer structure stacked in the third direction DR3. The conductive layer in a single layer structure may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), or indium zinc tin oxide (IZTO). In addition, in one embodiment, the transparent conductive layer may include conductive polymer, such as PEDOT, a metal nano-wire, or graphene.

A conductive layer in the multi-layer structure may include a plurality of metal layers. The metal layers may, for example, have a three-layer structure of titanium/aluminum/titanium. In one embodiment, the conductive layer of the multi-layer structure may include at least one metal layer and at least one transparent conductive layer.

At least one of the sensor insulating layer 230 and the cover insulating layer 250 may include an inorganic layer. The inorganic layer may include at least one of aluminum oxide, titanium oxide, silicon oxide, silicon nitride, silicon oxynitride, zirconium oxide, or hafnium oxide. At least one of the sensor insulating layer 230 or the cover insulating layer 250 may include an organic layer. The organic layer may include at least one of an acrylic resin, a methacrylic resin, a polyisoprene, a vinyl resin, an epoxy resin, a urethane resin, a cellulose resin, a siloxane resin, a polyimide resin, a polyamide resin, or a perylene resin.

A parasitic capacitance Cb may be present between the input sensor 200 and the second electrode CE. The parasitic capacitance Cb may also be referred to as a "base capacitance". As a distance between the input sensor 200 and the second electrode CE decreases, a value of the parasitic capacitance Cb may become greater. As the parasitic capacitance Cb is increased, the ratio of a variation in capacitance to a reference value may be reduced. A variation in capacitance may include the case where a change in capacitance is generated due to contact of the input unit, for example, contact of the physical body of the user or a change in a capacitance generated due to the proximity of the object.

Figure 5:
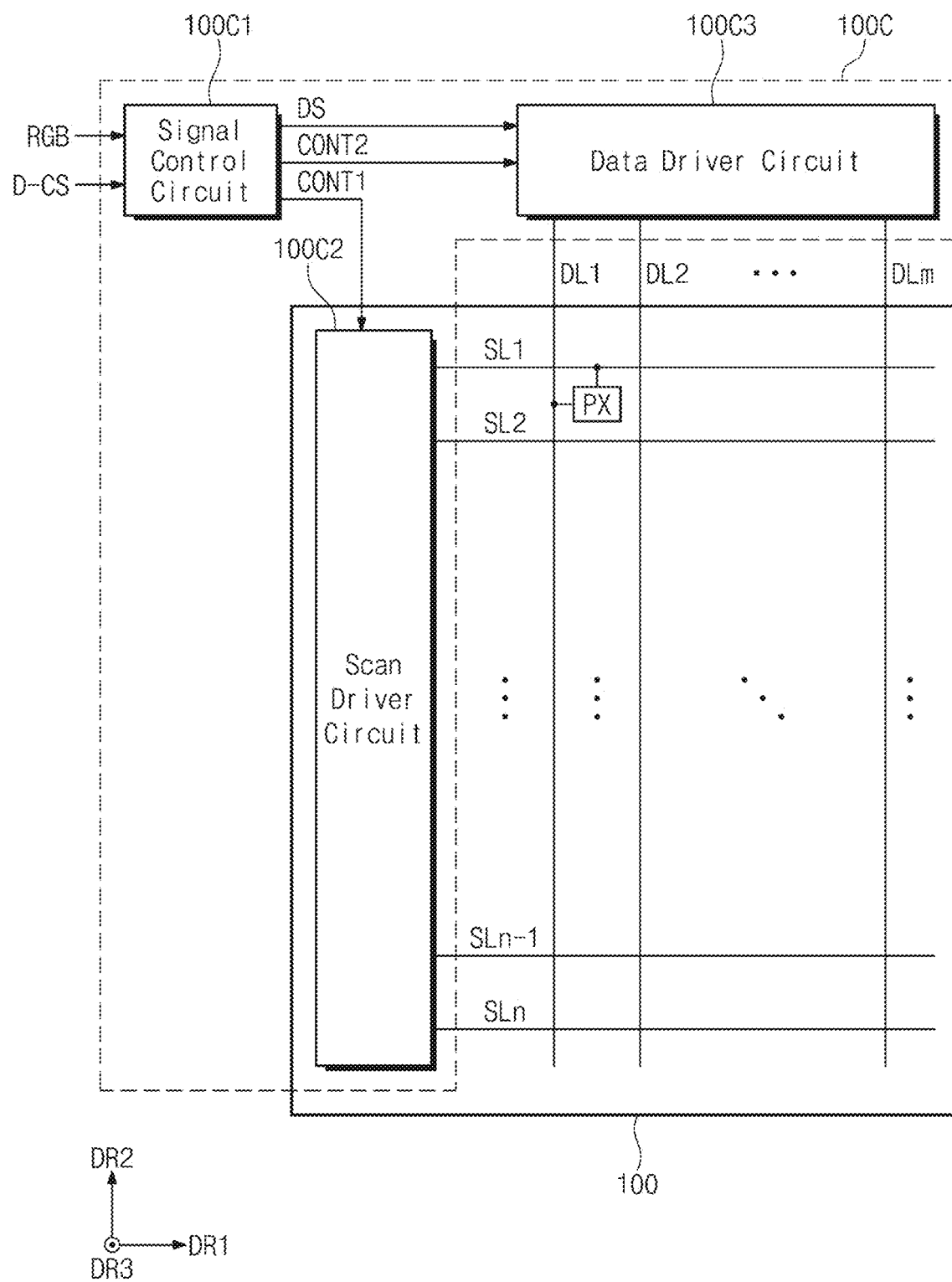
FIG. 5 is a block diagram of a display panel and a panel driver according to an embodiment of the present disclosure.

FIG. 5 is a block diagram of the display panel 100 and the panel driver 100C according to an embodiment of the present disclosure.

Referring to FIG. 5, the display panel 100 may include a plurality of scan lines SL1 to SLn, a plurality of data lines DL1 to DLm, and a plurality of pixels PX. Each of the plurality of pixels PX is connected with a corresponding data line of the plurality of data lines DL1 to DLm, and may be connected with a corresponding scan line of the plurality of scan lines SL1 to SLn. According to an embodiment of the present disclosure, the display panel 100 may further include the light emitting control lines, and the panel driver 100C may further include a light emitting driver circuit that provides control signals to the light emitting control lines. A configuration of the display panel 100 is not specifically limited.

Each of the plurality of scan lines SL1 to SLn may extend in the first direction DR1, and the plurality of scan lines SL1 to SLn may be arranged to be spaced from each other in the second direction DR2. Each of the plurality of data lines DL1 to DLm may extend in the second direction DR2, and the plurality of data lines DL1 to DLm may be arranged to be spaced from each other in the first direction DR1.

The panel driver 100C may include a signal control circuit 100C1, a scan driver circuit 100C2, and a data driver circuit 100C3. The signal control circuit 100C1 may receive the image data RGB and the display control signal D-CS from the main controller 1000C (e.g., see FIG. 2). The display control signal D-CS may include various signals. For example, the display control signal D-CS may include a vertical synchronization signal, a horizontal synchronization signal, a main clock, and/or a data enable signal.

The signal control circuit 100C1 may generate a scan control signal CONT1 based on the display control signal D-CS and may output the scan control signal CONT1 to the scan driver circuit 100C2. The scan control signal CONT1 may include a vertical start signal and a clock signal. The signal control circuit 100C1 may generate a data control signal CONT2 based on the display control signal D-CS and may output the data control signal CONT2 to the data driver circuit 100C3. The data control signal CONT2 may include a horizontal start signal and an output enable signal.

In addition, the signal control circuit 100C1 may output a data signal DS to the data driver circuit 100C3. The data signal DS may be obtained by processing the image data RGB to be appropriate for an operating condition of the display panel 100. The scan control signal CONT1 and the data control signal CONT2, that are signals used for operations of the scan driver circuit 100C2 and the data driver circuit 100C3, are not specifically limited.

The scan driver circuit 100C2 drives the plurality of scan lines SL1 to SLn in response to the scan control signal CONT1. According to an embodiment of the present disclosure, the scan driver circuit 100C2 may be formed using the same process used to form the circuit layer 120 (e.g., refer to FIG. 4) in the display panel 100, but the present disclosure is not limited thereto. For example, the scan driver circuit 100C2 may be implemented in the form of an integrated circuit (IC) mounted directly in a specific region of the display panel 100, or mounted in the form of a chip on film (COF) manner on a separate printed circuit board, such that the scan driver circuit 100C2 is electrically connected to the display panel 100.

The data driver circuit 100C3 may output gray scale voltages to the plurality of data lines DL1 to DLm in response to the data control signal CONT2 and the data signal DS from the signal control circuit 100C1. The data driver circuit 100C3 may be implemented in the form of an integrated circuit directly mounted in a specific region of the display panel 100, or may be mounted, in the chip on film manner, on a separate printed circuit board. In this latter case, the data driver circuit 100C3 may be electrically connected to the display panel 100. In one embodiment, the data driver circuit 100C3 may be formed using the same process used to form the circuit layer 120 (e.g., refer to FIG. 4) in the display panel 100.

The plurality of pixels PX may have the same circuit structure. Each pixel PX includes the light emitting element ED (e.g., see FIG. 4) and a pixel circuit unit. The light emitting element ED may include a light emitting diode. The light emitting diode may include an organic light emitting material, an inorganic light emitting material, a quantum dot, a quantum rod, or the like, as an emission layer.

The pixel circuit unit includes at least one transistor TR (e.g., see FIG. 4) and at least one capacitor. In one embodiment, the transistor TR may have a low-temperature polycrystalline silicon (LTPS) semiconductor layer or may have an oxide semiconductor layer. The transistor TR may be a P-type transistor or an N-type transistor.

Figure 6:
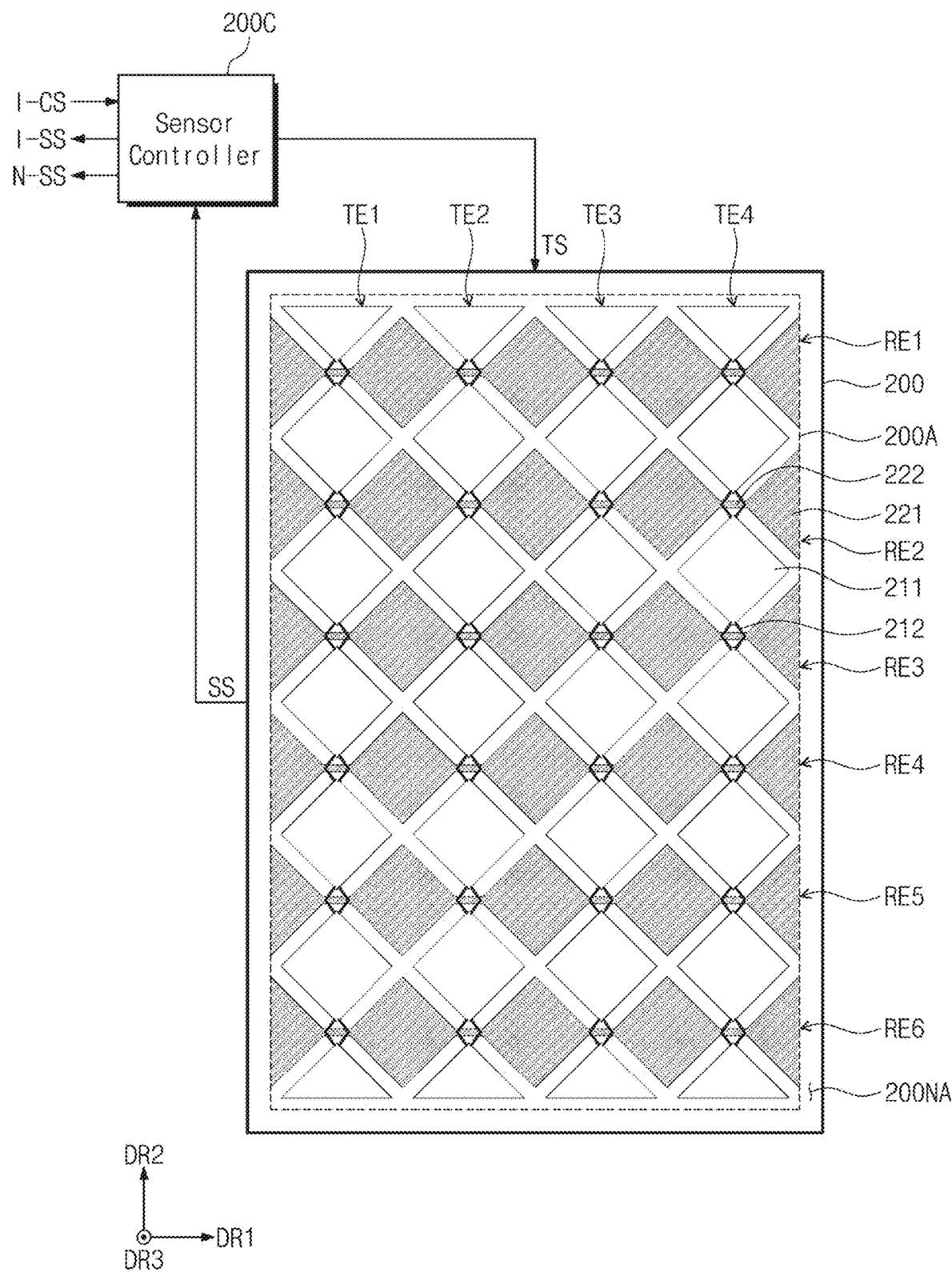
FIG. 6 is a block diagram illustrating an input sensor and a sensor controller according to an embodiment of the present disclosure.

FIG. 6 is a block diagram illustrating the input sensor 200 and a sensor controller 200C according to an embodiment of the present disclosure.

Referring to FIG. 6, the input sensor 200 may include a plurality of transmit electrodes TE1 to TE4 (or first sensing electrodes) and a plurality of receive electrodes RE1 to RE6 (or second sensing electrodes). The plurality of transmit electrodes TE1 to TE4 may extend in the second direction DR2 and may be arranged in the first direction DR1. The plurality of receive electrodes RE1 to RE6 may extend in the first direction DR1 and may be arranged in the second direction DR2. The plurality of transmit electrodes TE1 to TE4 may cross the plurality of receive electrodes RE1 to RE6. A capacitance may be formed between the plurality of transmit electrodes TE1 to TE4 and the plurality of receive electrodes RE1 to RE6.

The input sensor 200 may further include a plurality of first signal lines connected to the plurality of transmit electrodes TE1 to TE4 and a plurality of second signal lines connected to the plurality of receive electrodes RE1 to RE6.

The input sensor 200 includes a sensing region 200A and a non-sensing region 200NA. The sensing region 200A may correspond to the active region AA illustrated in FIG. 1, and the non-sensing region 200NA may correspond to the peripheral region NAA illustrated, for example, in FIG. 1. The sensing region 200A may sense an input, as the plurality of transmit electrodes TE1 to TE4 and the plurality of receive electrodes RE1 to RE6 are disposed in the sensing region 200A. The non-sensing region 200NA may be a region in which the input is not sensed, as the first and second signal lines are disposed in the non-sensing region 200NA.

Each of the plurality of transmit electrodes TE1 to TE4 may include a first sensing part 211 and a bridge part 212. The two first sensing parts 211 adjacent to each other may be electrically connected by the bridge part 212, but the present disclosure is not particularly limited thereto. The first sensing part 211 and the bridge part 212 may be disposed in mutually different layers. For example, the first sensing part 211 may be included in the second conductive layer 240 (e.g., see FIG. 4), and the bridge part 212 may be included in the first conductive layer 220 (e.g., see FIG. 4). In one embodiment, the first sensing part 211 may be included in the first conductive layer 220, and the bridge part 212 may be included in the second conductive layer 240.

Each of the plurality of receive electrodes RE1 to RE6 may include a second sensing part 221 and a connection part 222. The second sensing part 221 and the connection part 222 may have an integrated (or continuous) shape and may be disposed in the same layer. For example, the second sensing part 221 and the connection part 222 may be included in the second conductive layer 240. In one embodiment, the second sensing part 221 and the connection part 222 may be included in the first conductive layer 220.

The bridge part 212 may be insulated from the connection part 222. When the first and second sensing parts 211 and 221 and the connection part 222 are included in the second conductive layer 240, the bridge part 212 may be included in the first conductive layer 220. In one embodiment, when the first and second sensing parts 211 and 221 and the connection part 222 are included in the first conductive layer 220, the bridge part 212 may be included in the second conductive layer 240.

The sensing insulating layer 230 is interposed between the first sensing part 211 and the bridge part 212. The first sensing part 211 may be electrically connected to the bridge part 212 through a contact hole CHa (e.g., see FIG. 4) in the sensor insulating layer 230.

Each of the plurality of transmit electrodes TE1 to TE4 may have a mesh shape, and each of the plurality of receive electrodes RE1 to RE6 may have a mesh shape. The mesh shapes of the transmit electrodes TE1 to TE4 and the receive electrodes RE1 to RE6 may be similar to or different from one another.

The first sensing part 211, the second sensing part 221, the bridge part 212, and the connection part 222 may include a metal layer. The first sensing part 211, the second sensing part 221, the bridge part 212, and the connection part 222 may have a mesh shape. Accordingly, opening parts defined by the mesh lines may be defined in the first sensing part 211 and the second sensing part 221. According to an embodiment of the present disclosure, each opening may have a predetermined (e.g., diamond) shape.

When viewed in a plan view, the plurality of light emitting elements ED (e.g., see FIG. 4) may be disposed in each of touch opening parts. Accordingly, the light emitting from each light emitting element ED may be output without being influenced by the first and second sensing parts 211 and 221.

The sensor controller 200C may receive the sensing control signal I-CS from the main controller 1000C (e.g., see FIG. 2) and may provide the coordinate signal I-SS or the proximity sensing signal N-SS to the main controller 1000C. For example, the sensor controller 200C may be implemented in the form of an integrated circuit (IC) mounted directly in a specific region of the input sensor 200, or mounted in the form of a chip on film (COF) manner on a separate printed circuit board, such that the sensor controller 200C is electrically connected to the input sensor 200.

The sensor controller 200C may output transmit signals TS to the input sensor 200, for example, to the transmit electrodes TE1 to TE4. The sensor controller 200C may receive sensing signals SS from the receive electrodes RE1 to RE6 of the input sensor 200. The sensor controller 200C may amplify and/or filter received analog-type sensing signals SS and convert the (e.g., filtered) signal into a digital signal.

The sensor controller 200C may generate the coordinate signal I-SS or the proximity sensing signal N-SS based on the digital signal. For example, the sensor controller 200C may generate the proximity sensing signal N-SS by determining whether a proximity of an object (e.g., a first input) is present by using a digital signal. The sensor controller 200C may generate the coordinate signal I-SS for a second input (e.g., a touch input) by a user finger using a digital signal.

Figure 7:
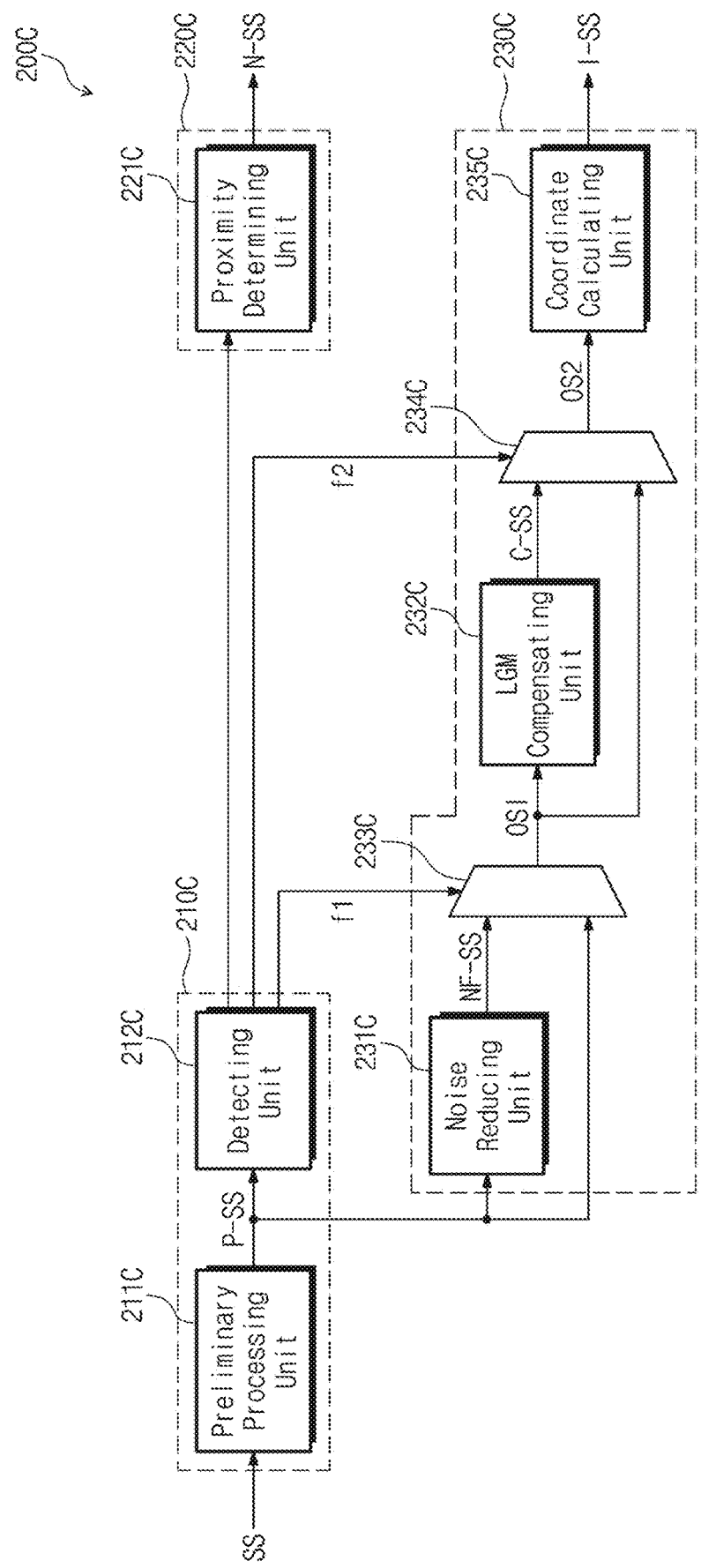
FIG. 7 is a block diagram illustrating an internal structure of a sensor controller according to an embodiment of the present disclosure.

FIG. 7 is a block diagram illustrating the sensor controller 200C according to an embodiment of the present disclosure.

Referring to FIG. 7, the sensor controller 200C may include a neural network processing unit (processor) 210C, a first input processing unit (processor) 220C, and a second input processing unit (processor) 230C. The neural network processing unit 210C may receive the sensing signal SS from the input sensor 200 (e.g., see FIG. 6) and output one of a first sensing result or a second sensing result using a prediction model. For example, according to the present disclosure, the neural network processing unit 210C may include a preliminary processing unit (processor) 211C and a detecting unit (detector) 212C.

The preliminary processing unit 211C may preliminarily process the sensing signal SS received from the input sensor 200 and output a preliminary processing signal P-SS. The preliminary processing signal P-SS may be a signal generated by standardizing (or quantizing) the sensing signal SS. For an example, according to the present disclosure, the sensing signal SS may be an analog signal, and the preliminary processing signal P-SS may be a digital signal.

The detecting unit 212C may receive the preliminary processing signal P-SS from the preliminary processing unit 211C and apply the preliminary processing signal P-SS to a prediction model to output one of a first sensing result or a second sensing result. According to an embodiment of the present disclosure, the prediction model may be a deep-learning model such as, but not limited to, a convolutional neural network (CNN) model. Another example of the deep-learning model may include a recurrent neural network (RNN). The prediction model may be trained with respect to various detection cases, and the detecting unit 212C may generate a sensing result (e.g., one of the first or second sensing results) for the preliminary processing signal P-SS based on learning data.

The preliminary processing unit 211C may further perform a masking operation of masking cases excluded from preset detection cases. For example, as a result of making a determination based on the sensing signal received from the input sensor 200, when a sensing input does not correspond to any detection case, the preliminary processing unit 211C may exclude or disregard the sensing signal SS without performing preliminary processing on the sensing signal SS. Accordingly the preliminary processing unit 211C may prevent the detecting unit 212C from performing an unnecessary detecting operation, in advance.

In addition, the preliminary processing unit 211C may further perform a preliminarily determining operation for a case, which corresponds to the sensing input, based on the sensing signal SS. In one embodiment, the preliminary processing unit 211C may not perform the preliminarily determining operation as described above. For example, when the prediction model is determined as being sufficiently trained, the preliminarily determining operation may be omitted.

The first input processing unit 220C may receive a signal corresponding to the first sensing result from the neural network processing unit 210C, and may determine whether a first input is present based on the first sensing result. For example, according to the present disclosure, the first input processing unit 220C may be a proximity determining unit 221C which determines whether the first input is present (depending on the proximity of the object) based on the first sensing result. When the neural network processing unit 210C determines (based on the sensing signal SS) that proximity of the object is present, the neural network processing unit 210C may output a signal or information indicative of a distance between the object and the input sensor as the first sensing result.

The proximity determining unit 221C may determine whether proximity of the object is present based on the first sensing result. For example, when the distance exceeds a preset proximity threshold value Th1 (e.g., a first threshold value, see FIG. 11), the proximity determining unit 221C may determine that proximity of the object does not exist. When the distance is less than or equal to the threshold value Th1, the proximity determining unit 221C may determine that the proximity of the object exists. The determination result of the proximity determining unit 221C may be output as the proximity sensing signal N-SS.

The second input processing unit 230C may include a noise reducing unit (noise reducer) 231C, a low ground mass (LGM) compensating unit (compensator) 232C, and a coordinate calculating unit (calculator) 235C. The noise reducing unit 231C may output a noise free signal NF-SS by removing noise from the preliminary processing signal P-SS. According to an embodiment of the present disclosure, the noise reducing unit 231C may generate the noise free signal NF-SS, for example, by subtracting a noise prediction value from the preliminary processing signal P-SS. In this case, the noise prediction value may a value predicted through a noise prediction model.

The LGM compensating unit 232C may output a compensation signal by performing a low ground mass (LGM) compensating operation. According to an embodiment of the present disclosure, the LGM compensating operation may include an operation of removing an LGM interference signal from the preliminary processing signal P-SS or the noise free signal NF-SS. According to an embodiment of the present disclosure, the LGM interference signal may be an interruption signal generated in a state where the user does not grip the display device 1000 (e.g., see FIG. 1).

The second input processing unit 230C may further include a first selecting unit (selector) 233C and a second selecting unit (selector) 234C. The second input processing unit 230C may activate the first and second selecting units 233C and 234C by receiving the second sensing result from the neural network processing unit 210C. According to an embodiment of the present disclosure, the neural network processing unit 210C may output, as the second sensing result, at least one of a first flag signal f1 (activated when noise is detected from the preliminary processing signal P-SS) or a second flag signal f2 activated when an LGM interference signal is detected from the preliminary processing signal P-SS.

The first selecting unit 233C may be disposed between the noise reducing unit 231C and the LGM compensating unit 232C. The first selecting unit 233C may receive the preliminary processing signal P-SS and the noise free signal NF-SS, and output, as a first output signal OS1, one of the preliminary processing signal P-SS or the noise free signal NF-SS, in response to the first flag signal f1.

The second selecting unit 234C may be disposed between the LGM compensating unit 232C and the coordinate calculating unit 235C. The second selecting unit 234C may receive the first output signal OS1 and a compensation signal C-SS, and output, as a second output signal OS2, one of the first output signal OS1 or the compensation signal C-SS, in response to the second flag signal f2.

The coordinate calculating unit 235C may receive the second output signal OS2 from the second selecting unit 234C and may calculate the coordinate signal I-SS (or coordinate information) for the second (touch) input based on the second output signal OS2.

As described above, because the neural network processing unit 210C is provided in the sensor controller 200C, the proximity state, the noise state, the LGM interference state, etc., may be simultaneously detected. Accordingly, the configuration of the sensor controller 200C may be simplified.

Figure 8:
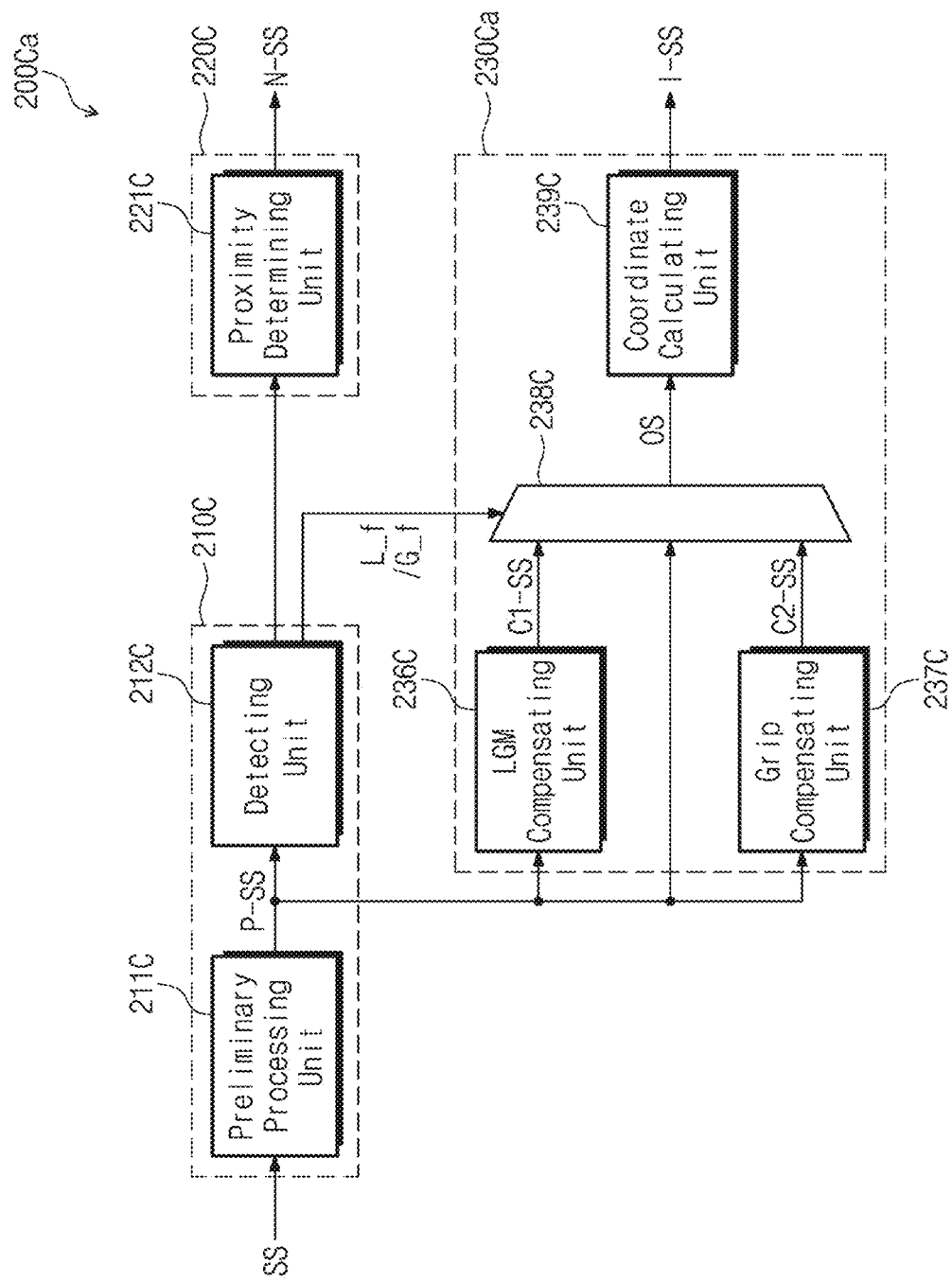
FIG. 8 is a block diagram illustrating an internal structure of a sensor controller according to an embodiment of the present disclosure.
Figure 9A:
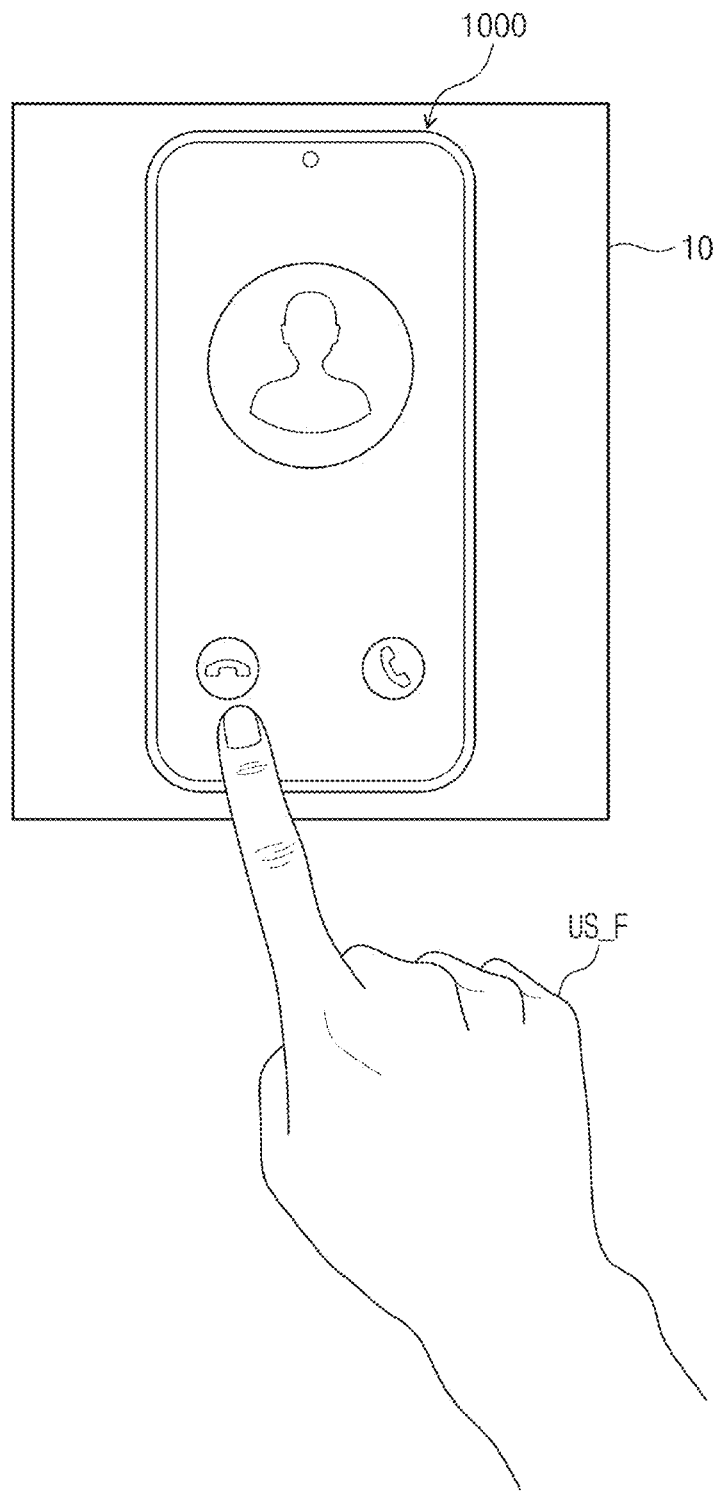
FIG. 9A is a view illustrating the state that an LGM interference is made according to an embodiment of the present disclosure.
Figure 9B:
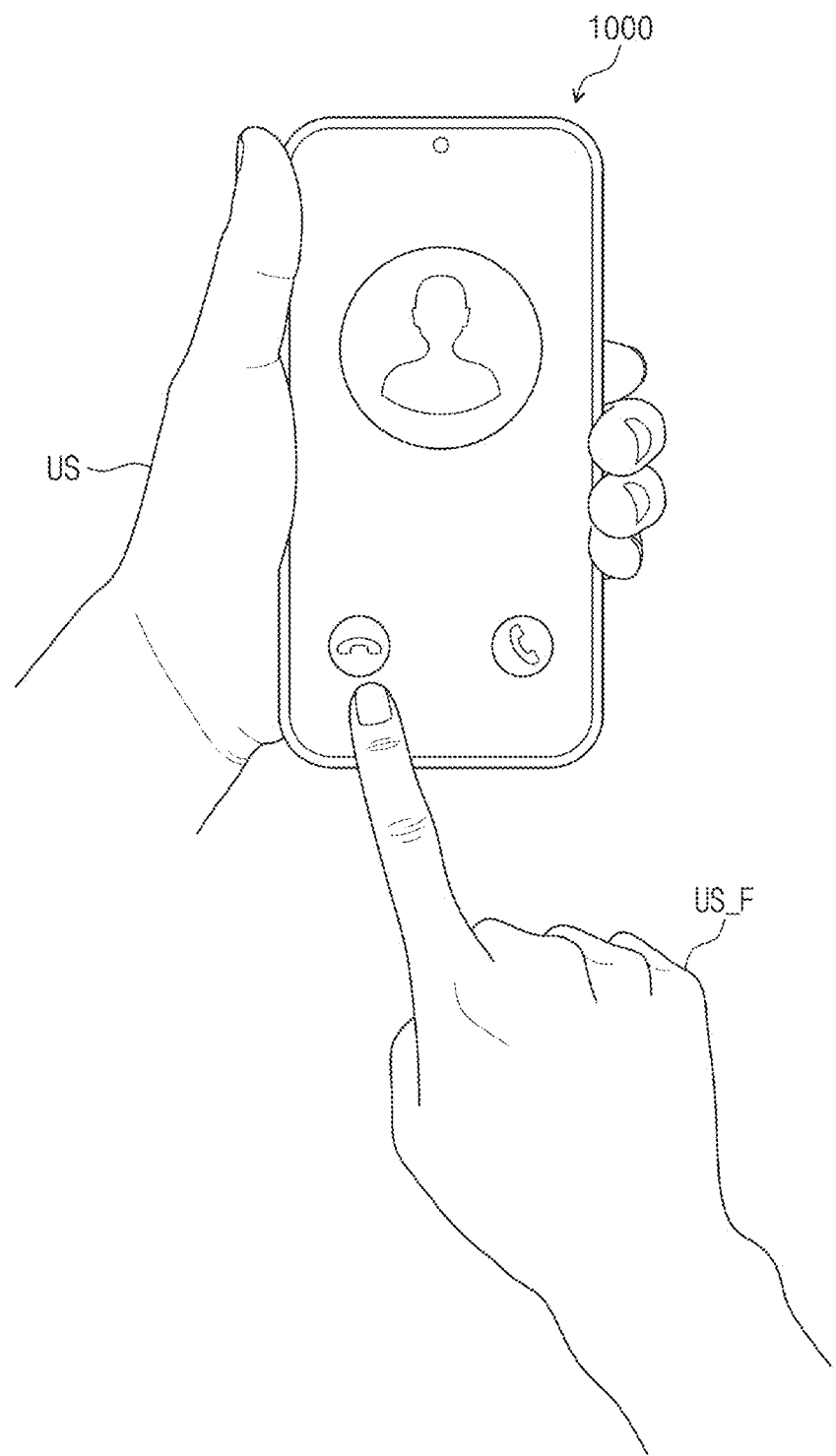
FIG. 9B is a view illustrating the state that grip interruption is made according to an embodiment of the present disclosure.

FIG. 8 is a block diagram illustrating an internal structure of a sensor controller, according to an embodiment of the present disclosure. FIG. 9A is a view illustrating an example where LGM interference is present according to an embodiment of the present disclosure. FIG. 9B is a view illustrating an example where a grip interruption is present according to an embodiment of the present disclosure. The same reference numerals will be assigned to like components illustrated in FIG. 7 and FIG. 8 and the details thereof will be omitted.

Referring to FIG. 8, a sensor controller 200Ca may include the neural network processing unit 210C, the first input processing unit 220C, and a second input processing unit (processor) 230Ca.

The second input processing unit 230Ca may include an LGM compensating unit (compensator) 236C, a grip compensating unit (compensator) 237C, and a coordinate calculating unit (calculator) 239C.

The LGM compensating unit 236C may output a first compensation signal C1-SS by performing an LGM compensation operation. The LGM compensating operation may include an operation of removing an LGM interference signal from the preliminary processing signal P-SS. According to an embodiment of the present disclosure, the LGM interference signal may be an interruption signal generated in a state where a user US (e.g., see FIG. 9B) does not grip the display device 1000 (for example, the state that the display device 1000 is placed on a table 10), as illustrated in FIG. 9A.

The grip compensating unit 237C may output a second compensation signal C2-SS by removing a grip interference signal from the preliminary processing signal P-SS. As illustrated in FIG. 9B, the grip interference signal may be an interference signal generated in a state where the user US grips the display device 1000.

The second input processing unit 230Ca may further include a selecting unit (selector) 238C. The second input processing unit 230Ca may activate the selecting unit 238C by receiving a second sensing result from the neural network processing unit 210C. According to an embodiment of the present disclosure, the neural network processing unit 210C may output, as the second sensing result, one of an LGM flag signal L_f (which is activated when the LGM interference signal is detected from the preliminary processing signal P-SS) or a grip flag signal G_f activated when a grip interference signal is detected from the preliminary processing signal P-SS.

The selecting unit 238C may receive the preliminary processing signal P-SS, the first compensation signal C1-SS, and the second compensation signal C2-SS, and output, as an output signal OS, one of the preliminary processing signal P-SS, the first compensation signal C1-SS, or the second compensation signal C2-SS, in response to the LGM flag signal L_f or the grip flag signal G_f.

The coordinate calculating unit 239C may receive the output signal OS from the selecting unit 238C and calculate the coordinate signal I-SS (or coordinate information) for the second input (e.g., a touch by the user finger US-F) based on the output signal OS.

Figure 10A:
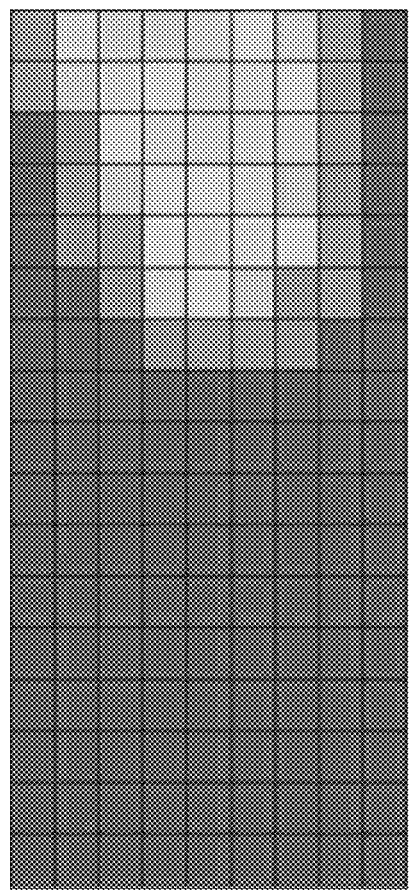
Figure 10B:
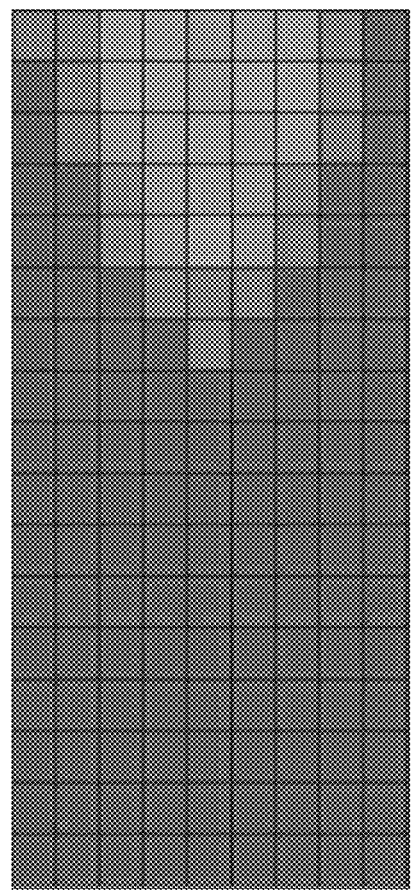
Figure 11:
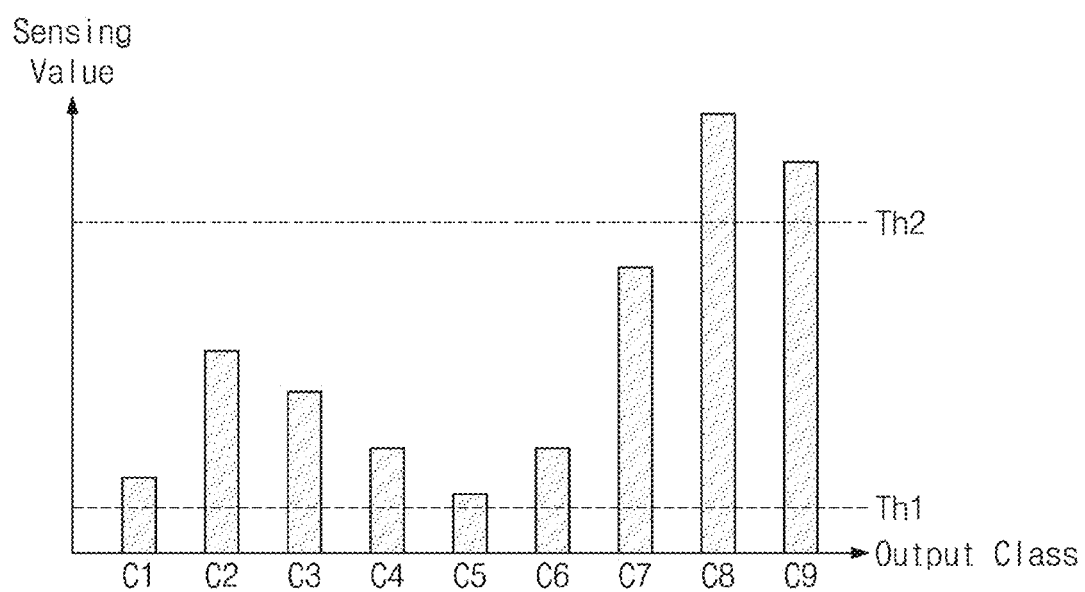
FIG. 11 is a graph illustrating a sensing value for each of a plurality of output classes according to an embodiment of the present disclosure.

FIGS. 10A to 10F are views illustrating some of a plurality of output classes set in the detecting unit according to an embodiment of the present disclosure, and FIG. 11 is a graph illustrating a sensing value for each of a plurality of output classes according to an embodiment of the present disclosure.

According to an embodiment of the present disclosure, the plurality of output classe C1 to C9 may be preset for the detecting unit 212C (e.g., see FIG. 7). In this way, the detecting unit 212C may include a classifier or prediction model that indicates one of the classes in Table 1 based on preliminary processing signal P-SS. Although the following table illustrates nine output classes C1 to C9, the number of output classes set to the detecting unit 212C is not specifically limited thereto.

TABLE 1

| Output class | First sensing result |
| --- | --- |
| C1 | 0 mm |
| C2 | 5 mm |
| C3 | 10 mm |
| C4 | 15 mm |
| C5 | 20 mm |

| Output class | Second sensing result |
| --- | --- |
| C6 | LGM detected |
| C7 | Noise detected |
| C8 | Grip detected |
| C9 | Finger detected |

When the sensing input corresponds to the first to fifth output classes C1 to C5 of the plurality of output classes C1 to C9, the detecting unit 212C may output the first sensing result. For example, as illustrated in FIGS. 10A and 10B, when the sensing input corresponds to the second output class C2, a second distance (i.e., 5 mm) may be output as the first sensing result. When the sensing input corresponds to the third output class C3, a third distance (that is, 10 mm) may be output as the first sensing result.

Referring to FIGS. 7, 8, and 11, the proximity determining unit 221C may compare the first sensing result with the first threshold value Th1 to determine whether proximity of the object is present (e.g., whether the first input is present). For example, when the sensing input corresponds to each of the first to fifth output classes C1 to C5, the distance (e.g., sensing value) corresponding to each of the output classes C1 to C5 is provided to the proximity determining unit 221C. The proximity determining unit 221C may compare the distance with the first threshold value Th1. When the distance exceeds the first threshold value Th1, the proximity determining unit 221C may determine that the proximity is absent. When the distance is equal to or less than the first threshold value Th1, the proximity determining unit 221C may determine that the proximity is present. The first threshold value Th1 may be set to a predetermined value, e.g., 20 mm. The predetermined value may be a different distance in another embodiment. When the first threshold value Th1 is set to about 20 mm, the first to fifth output classes C1 to C5 may be determined as being in the proximity state. When the first threshold value Th1 is set to about 10 mm, although the first to third output classes C1 to C3 are determined as being in proximity state, the fourth and fifth output classes C4 and C5 may be determined as not being in proximity state.

When the sensing input corresponds to the sixth to ninth output classes C6 to C9 of the plurality of output classes C1 to C9, the detecting unit 212C may output the second sensing result. As illustrated in FIG. 10C, when the sensing input corresponds to the sixth output class C6 and when the LGM interference is determined as being detected, the detecting unit 212C may output the second flag signal f2 (e.g., see FIG. 7) or the LGM flag signal L_f (e.g., see FIG. 8) as the second sensing result. As illustrated in FIG. 10D, when the sensing input corresponds to the seventh output class C7 and when the noise is determined as being detected, the detecting unit 212C may output the first flag signal f1 (e.g., see FIG. 7). As illustrated in FIG. 10E, when the sensing input corresponds to the eighth output class C8 and when the grip interruption is determined as being detected, the detecting unit 212C may output the grip flag signal G_f (e.g., see FIG. 8) as the second sensing result.

As illustrated in FIGS. 7, 8, 10F, and 11, when the sensing input corresponds to the ninth output class C9, it is determined that only the touch is detected, the detecting unit 212C may deactivate the first and second flag signals f1 and f2 or the grip flag signal G_f. In this case, the coordinate calculating units 235C and 239C may receive the preliminary processing signal P-SS as the second output signal OS2 (or the output signal OS)) and generate the coordinate signal I-SS for the second input based on the received second output signal OS2 (or the received output signal OS).

The coordinate calculating units 235C and 239C may compare the second output signal OS2 (or the output signal OS in the case of FIG. 8) with a preset second threshold Th2 to determine the presence or absence of the second input. For example, when the second output signal OS2 (or the output signal OS in the case of FIG. 8) is greater than or equal to the second threshold Th2, the coordinate calculating units 235C and 239C may determine the second input as being made and may generate the coordinate signal I-SS for the second input. However, when the second output signal OS2 (or output signal OS in FIG. 8) is less than or equal to the second threshold Th2, the coordinate calculating units 235C and 239C may determine the second input as not being made and does not generate the coordinate signal I-SS for the second input.

When a new detection function is to be added to the detecting unit 212C in addition to the first to ninth output classes, it may be determined simply by designating a new output class and then subjecting the model in the detecting unit 212C to a re-learning (or re-training) process based on training data sets that correspond to the new output class. Accordingly, various detections may be possible without changing a circuit design of the sensor controller 200C.

According to an embodiment of the present disclosure, as the neural network processing unit is provided in the sensor controller, a proximity state, a noise state, an LGM interference state, etc., may be simultaneously detected. Accordingly, the configuration of the sensor controller may be simplified. Moreover, a new output class may be learned and detected without changing in the circuit design of the sensor controller, and the new detection function may be added.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein. For example, the prediction model or classifier described herein may be implemented by code or instructions stored in the computer-readable medium and executed by the computer, processor, controller, or other signal processing device, which, for example, may include one or more of the processors 210C, 220C, and 230C described herein.

The controllers, processors, devices, models, units, selectors, compensators, logic, drivers and other signal generating and signal processing features of the embodiments disclosed herein may be implemented, for example, in non-transitory logic that may include hardware, software, or both. When implemented at least partially in hardware, the controllers, processors, devices, models, units, selectors, compensators, logic, drivers and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, models, units, selectors, compensators, logic, drivers and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although an embodiment of the present disclosure has been described for illustrative purposes, those skilled in the art will appreciate that various modifications, and substitutions are possible, without departing from the scope and spirit of the invention as disclosed in the accompanying claims. Accordingly, the technical scope of the inventive concept is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims. The embodiments may be combined to form additional embodiments.

What is claimed is:

1. A sensor controller, comprising:
  a neural network processor configured to receive a sensing signal from an input sensor and to output one of a first sensing result or a second sensing result using a prediction model;
  a first input processor configured to receive the first sensing result and to determine whether a first input is present based on the first sensing result; and
  a second input processor configured to receive the second sensing result and to calculate a coordinate signal for a second input based on the second sensing result, wherein the first input processor includes:
  a proximity processor configured to determine whether the first input is present based on the first sensing result, wherein the first input depends on a proximity of an object relative to the sensor.

2. The sensor controller of claim 1, wherein the neural network processor is configured to output a distance between the object and the input sensor as the first sensing result.

3. A sensor controller comprising:
  a neural network processor configured to receive sensing signals from an input sensor and to output a first sensing result corresponding to a first input and a second sensing result corresponding to a second input using a prediction model;
  a first input processor configured to receive the first sensing result and to determine that the first input is present based on the first sensing result; and
  a second input processor configured to receive the second sensing result and to calculate a coordinate signal for the second input based on the second sensing result, wherein the first sensing result is indicative of a proximity of an object relative to the sensor.

4. The sensor controller of claim 3, wherein the neural network processor includes:
  a preliminary processor configured to preliminarily process the sensing signal and to output a preliminary processing signal; and
  a detector configured to receive the preliminary processing signal and to output one of the first sensing result or the second sensing result by applying the preliminary processing signal to the prediction model.

5. The sensor controller of claim 4, wherein the prediction model is a convolutional neural network model.

6. The sensor controller of claim 4, wherein the second input processor includes:
  a noise remover configured to output a noise free signal by removing noise from the preliminary processing signal; and
  a low ground mass (LGM) compensator configured to output a compensation signal by performing a LGM compensation operation.

7. The sensor controller of claim 6, wherein the second sensing result includes: at least one of a first flag signal or a second flag signal, the first flag signal activated when the noise is detected from the preliminary processing signal and the second flag signal activated when an LGM interference signal is detected from the preliminary processing signal.

8. The sensor controller of claim 7, wherein the second input processor includes:
  a first selector configured to receive the preliminary processing signal and the noise free signal, and to output a first output signal in response to the first flag signal, wherein the first output signal corresponds to one of the preliminary processing signal or the noise free signal.

9. The sensor controller of claim 8, wherein the LGM compensator is configured to receive the first output signal from the first selector and output the compensation signal by performing the LGM compensation operation with respect to the first output signal.

10. The sensor controller of claim 9, wherein the second input processor includes:
  a second selector configured to receive the first output signal from the first selector, receive the compensation signal from the LGM compensator, and output a second output signal in response to the second flag signal, wherein the second output signal corresponds to one of the first output signal or the compensation signal.

11. The sensor controller of claim 10, wherein the second input processor includes:
  a coordinate calculator configured to receive the second output signal from the second selector and to calculate the coordinate signal for the second input based on the second output signal.

12. The sensor controller of claim 4, wherein the second input processor includes:
  an LGM compensator configured to output a first compensation signal by performing an LGM compensation operation with respect to the preliminary processing signal; and
  a grip compensator configured to output a second compensation signal by removing a grip interference signal from the preliminary processing signal.

13. The sensor controller of claim 12, wherein the second sensing result includes: at least one of an LGM flag signal or a grip flag signal, the LGM flag signal activated when an LGM interference signal is detected from the preliminary processing signal, and the grip flag signal activated when the grip interference signal is detected from the preliminary processing signal.

14. The sensor controller of claim 13, wherein the second input processor includes:
a selector configured to receive the preliminary processing signal, the first compensation signal, and the second compensation signal, and to output an output signal in response to the LGM flag signal or the grip flag signal, the output signal corresponding to one of the preliminary processing signal, the first compensation signal, or the second compensation signal.

15. The sensor controller of claim 14, wherein the second input processor includes: a coordinate calculator configured to receive the output signal from the selector and to calculate the coordinate signal for the second input based on the output signal.

16. A display device comprising:
a display panel configured to display an image;
an input sensor disposed on the display panel and configured to sense a first input or a second input;
a sensor controller configured to control driving of the input sensor; and
a panel driver configured to control driving of the display panel,
wherein the sensor controller includes:
a neural network processor configured to receive sensing signals from the input sensor and to output a first sensing result corresponding to a first input and a second sensing result corresponding to a second input by using a prediction model,
a first input processor configured to receive the first sensing result and to determine that the first input is present based on the first sensing result; and
a second input processor configured to receive the second sensing result and to calculate a coordinate signal of the second input based on the second sensing result,
wherein the first sensing result is indicative of a proximity of an object relative to the sensor.

17. The display device of claim 16, wherein the neural network processor includes:
a preliminary processor configured to preliminarily process the sensing signal and to output a preliminary processing signal; and
a detector configured to receive the preliminary processing signal and to output one of the first sensing result or the second sensing result by applying the preliminary processing signal to the prediction model, and
wherein the prediction model is a convolutional neural network model.

18. The display device of claim 17, wherein the first input processor includes:
a proximity determiner configured to determine whether proximity of the object is present based on the first sensing result, and
wherein the neural network processor is configured to output a distance to the object and an input sensor as the first sensing result.

19. The display device of claim 17, wherein the second sensing result includes: at least one of a first flag signal or a second flag signal, the first flag signal activated when noise is detected from the preliminary processing signal and the second flag signal activated when a low ground mass (LGM) interference signal is detected from the preliminary processing signal,
wherein the second input processor includes:
a noise remover configured to output a noise free signal by removing the noise from the preliminary processing signal;
a first selector configured to receive the preliminary processing signal and the noise free signal, and output a first output signal in response to the first flag signal, the first output signal corresponding to one of the preliminary processing signal or the noise free signal;
an LGM compensator configured to receive the first output signal from the first selector and to output a compensation signal by performing a LGM compensation operation with respect to the first output signal;
a second selector configured to receive the first output signal from the first selector, receive the compensation signal from the LGM compensator, and output a second output signal in response to the second flag signal, the second output signal corresponding to one of the first output signal or the compensation signal; and
a coordinate calculator configured to receive the second output signal from the second selector and to calculate the coordinate signal for the second input based on the second output signal.

20. The display device of claim 17, wherein the second sensing result includes: at least one of an LGM flag signal or a grip flag signal, the LGM flag signal activated when an LGM interference signal is detected from the preliminary processing signal and the grip flag signal activated when a grip interference signal is detected from the preliminary processing signal,
wherein the second input processor includes:
an LGM compensator configured to output a first compensation signal by performing an LGM compensation operation for the preliminary processing signal;
a grip compensator configured to output a second compensation signal by removing the grip interference signal from the preliminary processing signal;
a selector configured to receive the preliminary processing signal, the first compensation signal, and the second compensation signal and to output an output signal in response to the LGM flag signal or the grip flag signal, the output signal corresponding to one of the preliminary processing signal, the first compensation signal, or the second compensation signal; and
a coordinate calculator configured to receive the output signal from the selector and to calculate the coordinate signal for the second input based on the output signal.

* * * * *